Sept. 28, 1965 J. C. McADAM 3,208,511

TRANSISTOR ELEVATED COOLER

Filed Nov. 21, 1961

INVENTOR.
JOHN C. McADAM
BY
Beehler & Shanahan
ATTORNEYS 3,208,511

TRANSISTOR ELEVATED COOLER

John C. McAdam, Burbank, Calif., assignor, by mesne assignments, to International Electronic Research Corporation, a corporation of California Filed Nov. 21, 1961, Ser. No. 153,897
5 Claims. (Cl. 165—80)

The invention relates to heat dissipators for electronic components but more especially to a transistor cooler which at the same time provides a means for mounting the transistor with respect to a circuit board.

Experience has taught that with many types of transistors the performance is appreciably bettered when heat generated during operation is dissipated. With respect to transistors, there is in many instances a critical heat level above which destruction of a permanent character will take place even though overheating might persist for only a relatively short length of time. Often in line with the current trend to pack transistor circuits into a small space, there is increased likelihood of overheating under circumstances where the mounting areas upon which the transistors are mounted become a reservoir for the accumulation of heat which may ultimately raise to a point where the combined effect is chronic overheating. When the devices are in a compact arrangement, less opportunity is afforded for natural circulation of air to carry away heat.

It is therefore among the objects of the invention to provide a new and improved transistor cooler which is simple, inexpensive and compact while at the same time providing a substantial degree of cooling which may result either from the flow of convection currents around the cooler, the conduction of heat from the cooler to the mount, or a combination of both.

Another object of the invention is to provide a new and improved simple, light-weight transistor cooler which is capable of being releasably fastened to a mount such as a circuit board in such fashion that the cooler provides a means of spacing the transistor from the board out of direct contact, thereby to improve the cooling.

Still another object of the invention is to provide a new and improved heat dissipator for electric components which comprises in essence a bracket adapted to be releasably attached to a mounting board and which also permits the component to be releasably secured in the cooler, the arrangement having multiple advantages of cooling as a result of both conduction and convection and also as a result of spacing the component away from some portion of the apparatus which might be productive of a reservoir of heat.

Still further among the objects of the invention is to provide a new and improved cooler for electronic components having a series of spring elements extending therefrom, some of which are employed for the purpose of mounting the component upon a board, and others of which are for the purpose of securing the component to the cooler itself in a location removed from the board, thereby to promote a somewhat turbulent and free circulation of air about the assembly and in particular beneath the component and on all sides of it to produce the greatest possible cooling effect.

With these and other objects in view, the invention consists in the construction, arrangement and combination of the various parts of the device, whereby the objects contemplated are attained, as hereinafter set forth, pointed out in the appended claims and illustrated in the accompanying drawings.

Figures 1, 2, 3:
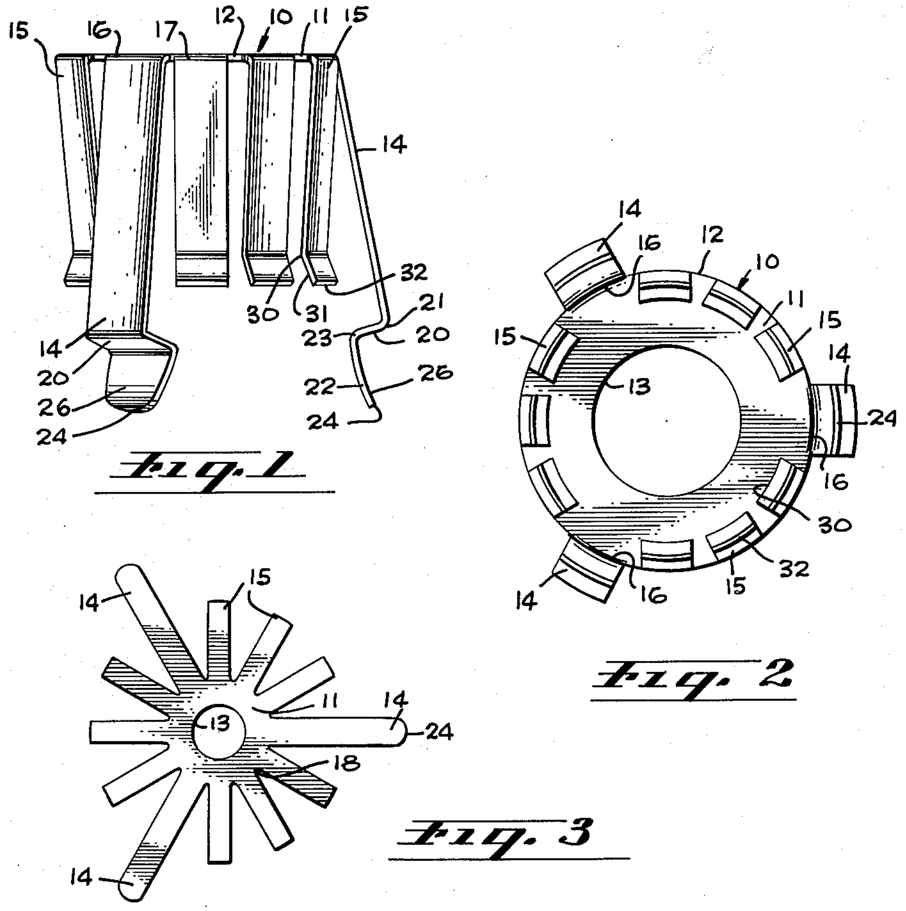
FIGURE 1 is a side elevational view of the transistor standing alone.
FIGURE 2 is a bottom view.
FIGURE 3 is a plan view of the blank from which the cooler is constructed.

In an embodiment of the invention which is primarily for the purpose of illustrating one example of the manner in which the invention can be constructed, there is shown a cooler shaped to serve as a transistor cooler comprising a body 10 which in this instance is formed of a single piece of sheet metal as indicated in FIGURE 3. The body consists essentially of an annular top plate 11 having a circumferential rim 12 and a relatively large central opening 13.

A series of legs 14, numbering three in the chosen embodiment, extend from the rim 12 in a generally axial direction and are tilted outwardly to a slight degree, as clearly indicated in FIGURE 1. The legs are spaced circumferentially providing room between them for the interpositioning of a plurality of fingers 15 numbering three in each instance in the form depicted in the drawings. The fingers are spaced from one another and also spaced from the legs 14 an appreciable distance so that there is ample room for air to circulate in and around the fingers and the legs.

By making a bend 16 for the legs and a corresponding bend 17 for the fingers at an appropriate location, an ample amount of space can be provided even though the junction 18 between adjacent fingers and the junction between fingers and legs extends virtually to a point when the blank is stamped as shown in FIGURE 3.

At lower free ends of the legs there is provided in each instance an outwardly and downwardly exposed shoulder 20 which joins the main portion of the leg at a corner 21. An outwardly extending guide area 22 is joined to the shoulder portion 20 at a rounded corner 23. A lowermost edge 24 of the leg is given a smooth rounded curve.

Figure 4:
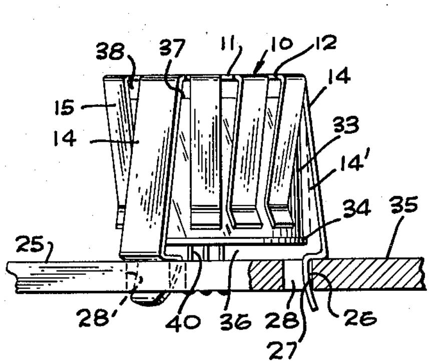
FIGURE 4 is a side elevational view showing a cooler mounted upon a circuit board in position supporting a transistor.

By reference to FIGURE 4, which shows a circuit board 25, it will be noted that the length of the guide area 22 is longer than the thickness of the circuit board and that there is an outwardly facing curved recess 26 which receives a side wall 27 of a hole 28. There is a hole 28 for each of the legs 14. The circuit board 25 may be of wood, laminated plastic or other appropriate material customarily used for this purpose.

At the lower free end of each finger 15 is an inwardly rounded corner 30 and adjacent the corner an outwardly extending sloping portion 31 terminating at an end edge 32. In the embodiment illustrated the fingers extend slightly inwardly in a radial direction and comprise spring elements for grasping and holding a transistor 33. The sloping portions 31 of the fingers make the operation of sliding the cooler over the transistor a simple, quick and easy operation.

It is most important to note that the length of the fingers is appreciably less than the length of the legs. Stated somewhat differently, the location of the shoulders 20 is at a distance from the annular top plate 11 appreciably greater than the distance of the end edge 32 of the fingers from the same top plate. Although this difference in distance is not critical, it should nevertheless be great enough so that when the transistor is placed within the cooler in the location shown in FIGURE 4, a base plate 34 of the transistor will be located an appreciable distance above an upper face 35 of the circuit board 25, thereby to leave a clear space 36 between the lowermost surface of the transistor base plate 34 and the upper face 35 of the circuit board.

It is further preferable to construct and proportion the fingers in such a manner that when the transistor is in place, as indicated in FIGURE 4, an uppermost face 37 of the transistor will be spaced from the inside surface of the top plate 11 and leave here also a clearance 38.

Customarily when the transistor is to be mounted upon a circuit board, it is customary to place the transistor in the cooler as has already been suggested by sliding the end edges 32 of the fingers 15 over the sides of the transistor casing. Once the transistor is in a position within the cooler with the base plate at approximately the location shown in FIGURE 4, the legs 14 are spring-pressed inwardly to a slight degree in order that the edges 24 in each instance can enter the respective hole 28, guided in position by the guide areas 22. The inwardly depressed position is indicated by the broken line 14' of FIGURE 4. Once in position, pressure upon the fingers is released and they will spring outwardly until the recesses 26 receive the side wall 27 of the hole in each instance and the shoulders 20 overlie the upper face 35 of the circuit board adjacent the edge of the hole as shown. This engagement provides a double retention effect in that the shoulder determines precisely the position of the cooler above the board and engagement of the side wall within the recess 26 resists inadvertent removal of the cooler upwardly from the board.

At the same time leads 40 from the transistor may be extended through appropriate holes (not shown) in the board to the underside where they may be fastened in the customary manner to a printed circuit or other circuit means.

Mounted as shown with the clear space 36 provided, there is good opportunity for air to flow between the casing of the transistor itself and the circuit board. Keeping the transistor out of contact with the board inhibits heat exchange therebetween. Should the transistor become relatively hot, the transfer of heat from the transistor to the board would be slowed down appreciably so as not to damage the circuit on the board.

Conversely, in some special instances, should the board be such as to comprise a reservoir of heat at a temperature higher than that which could be supported by the transistor, flow of heat from the board to the transistor would also be inhibited.

At the same time the arrangement of the fingers and the legs standing away from the transistor as shown and staggered and spaced with respect to each promotes a turbulent flow of air around the transistor and assists to an appreciable degree in conducting heat away from the transistor by convection. The clearance 38 and the opening 13 add to the prospect of good convection flow of air around the assembly. Since contact of the body of the cooler with the transistor causes a transfer of heat to the body, cooling by radiation also takes place.

Moreover, by reason of constructing the transistor of relatively thin sheet metal such, for example, as Berylco No. 25 Strip, having a thickness of .015 inch, or other appropriate resilient sheet metal of a comparable gauge, a spring clip can be formed by a simple stamping and forming operation into virtually finished form at a price which makes it possible to use the coolers advantageously without the penalty of high cost and with the very marked improvement in efficiency which proper cooling provides.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A cooling support for mounting a transistor on a circuit board comprising a plate area having a rim, a plurality of supporting legs extending from said rim in a generally axial direction, a free end of each said leg having a means including a shoulder extending in a generally transverse direction facing away from the rim and adapted to releasably engage the circuit board, the lengths of said legs between the plate and the respective shoulder being greater than the axial length of the transistor, a plurality of spring fingers attached to said rim, said fingers each having ends located closer to the rim than said shoulders, whereby when the transistor is in position retained by said fingers the transistor is supported entirely on one side of the shoulders at a location axially removed from said shoulders leaving a space therebetween.

2. A cooling support for mounting a transistor on a circuit board comprising a plate area having a rim, a plurality of supporting legs extending from said rim in a generally axial direction, a free end of each said leg having a means including a shoulder extending in a generally transverse direction and facing away from said rim and adapted to releasably engage the circuit board, ends of said legs at the shoulders being positioned radially outwardly further than the ends of said legs attached to the plate, the lengths of said legs between the plate and the respective shoulders being greater than the axial length of the transistor, a plurality of spring fingers attached to said rim between adjacent sides of each leg spaced from said sides and from each other, said fingers extending away from said rim in the same axial direction as said legs, each said finger having a length shorter than the distance from the rim to the shoulders on the respective leg, inwardly curved, outwardly extending free ends on the fingers at distances spaced axially from the shoulders adapted to slide over a transistor when attached thereto, whereby when the transistor is in position retained by said fingers the transistor is supported at a location axially removed from said shoulders leaving a space therebetween.

3. In a cooling support for mounting a transistor on a circuit board a sheet metal body comprising a plate area having a perimetral substantially annular rim, a plurality of supporting legs extending from said rim in a generally axial direction, said support having a central axis, a free end of each said leg having an outwardly resiliently biased and downwardly facing shoulder adapted to overlie a face of the circuit board at a distance radially outwardly of the axis greater than the distance of the other end of the respective leg from said axis, each said free end having an outwardly extending guide area adapted to guide the respective leg into position on the circuit board, said free end having an outwardly facing recess on the side opposite said guide area adapted to receive an edge portion of the circuit board whereby to resist removal of the support from the circuit board when in place thereon, a plurality of spring fingers attached to said rim, said fingers each having ends extending from the rim a distance less than the shoulders on said legs, said ends of the fingers being spaced relative to said axis at locations radially inward relative to said rim, whereby when the transistor is in position retained by said fingers the transistor is supported at a location removed from and entirely on one side of said circuit board leaving a space therebetween.

4. In a cooling support for mounting a transistor on a circuit board a sheet metal body comprising a plate area having a perimetral downwardly turned substantially annular rim, and having a relatively large central opening within said rim, a plurality of supporting legs having captive ends attached to said rim and extending from said rim in a generally axial direction, a free end of each said leg having an outwardly and downwardly exposed shoulder adapted to engage a face of the circuit board, the length of each leg between the plate area and the shoulder being greater than the axial length of the transistor, each said free end having an outwardly extending guide area adapted to guide the respective leg into position on the circuit board, said free end having an outwardly facing curved recess on the side opposite said guide area adapted to receive an edge portion of the circuit board whereby to resist removal of the support from the circuit board when in place thereon, said legs throughout their lengths being at positions radially outwardly of said rim, a plurality of spring fingers having captive ends attached to said rim between adjacent sides of each leg spaced from said sides and from each other, said fingers extending from said rim in the same axial direction as said legs and each having a length shorter than the distance from the rim to the shoulders on said legs and having an inwardly curved, outwardly extending free end on the fingers adapted to slide over a transistor when attached thereto, said free ends of the fingers being at positions radially inward of said rim, whereby when the transistor is in position retained by said fingers the transistor is supported on the same side of the circuit board as said legs and at a location axially removed from said shoulders leaving a space therebetween.

5. A cooled transistor mounting assembly comprising a transistor having a predetermined axial length and a cylindrical exterior, and an elevated support for mounting said transistor at an elevation spaced outwardly from the base of a circuit board to which the transistor may be electrically connected, said support comprising a plate area adapted to overlie one end of the transistor, a rim on said area located radially outwardly relative to said cylindrical exterior of the transistor, a plurality of circumferentially spaced spring fingers having one end of each attached to the rim and an inwardly rounded section at the free end of each finger adapted to engage the cylindrical exterior of the transistor, said inwardly rounded section being located radially inwardly relative to the rim, and a plurality of circumferentially spaced legs longer than said spring fingers and having one end of each attached to the rim, a configuration of the other end of each leg comprising a radially inwardly extending shoulder adapted to overlie the circuit board and a guide portion extending axially endwardly from the inner end of each said shoulder, the lengths of each leg between said plate area and said shoulder being greater than said axial length of the transistor, each said leg throughout the length thereof being spaced radially outwardly of the cylindrical exterior of the transistor, whereby said transistor is mounted in a location spaced axially outwardly of said circuit board and radially inwardly of said legs and intermediate portions of said fingers.

References Cited by the Examiner

UNITED STATES PATENTS

| | | | |
|---|---|---|---|
| Re. 25,184 | 6/62 | McAdam | 317—234 |
| 2,100,042 | 11/37 | Travis. | |
| 2,140,442 | 12/38 | Clark. | |
| 2,236,496 | 4/41 | Beggs | 248—27 |
| 2,238,238 | 4/41 | Westrope | 248—361 |
| 2,386,732 | 10/45 | Wohlhieter | 248—361 |
| 2,563,240 | 8/51 | Heath | 24—73 |
| 2,616,944 | 11/52 | Bedford | 248—27 X |
| 2,656,808 | 10/53 | Plumeri et al. | 165—262.16 X |
| 2,862,991 | 12/58 | Reardon | 165—80 X |
| 2,884,283 | 4/59 | Korol et al. | 248—27 X |
| 2,917,286 | 12/59 | Deakin | 165—80 |
| 3,057,950 | 10/62 | Allison | 165—80 X |

CHARLES SUKALO, *Primary Examiner.*

HERBERT L. MARTIN, *Examiner.*